United States Patent [19]

Brown et al.

[11] Patent Number: 4,828,016

[45] Date of Patent: May 9, 1989

[54] PROGRAMMABLE ELECTRONIC THERMOSTAT WITH MEANS FOR ENABLING ECONOMICAL RECOVERY

[75] Inventors: Bernard T. Brown, St. Louis; Dwain F. Moore, Marlborough, both of Mo.

[73] Assignee: Emerson Electric Co., St. Louis, Mo.

[21] Appl. No.: 137,433

[22] Filed: Dec. 23, 1987

[51] Int. Cl.⁴ .................. G05D 23/19; F25B 29/00
[52] U.S. Cl. ........................ 165/12; 165/28; 165/29; 236/46 R
[58] Field of Search ............ 165/12, 28, 29; 236/46 R

[56] References Cited

U.S. PATENT DOCUMENTS

| | | | |
|---|---|---|---|
| 3,348,607 | 10/1967 | Cootey | 165/28 |
| 4,265,298 | 5/1981 | Sumner, Jr. et al. | 165/2 |
| 4,265,299 | 8/1981 | Hannish | 165/29 |
| 4,338,791 | 7/1982 | Stamp, Jr. et al. | 165/29 |
| 4,386,649 | 6/1983 | Hines et al. | 165/12 |
| 4,387,763 | 6/1983 | Benton | 165/29 |
| 4,442,972 | 4/1984 | Sahay et al. | 236/1 EA |
| 4,627,483 | 12/1986 | Harshburger, III | 165/29 |
| 4,702,305 | 10/1987 | Beckey et al. | 165/29 |

Primary Examiner—Albert W. Davis, Jr.
Assistant Examiner—John K. Ford
Attorney, Agent, or Firm—Paul A. Becker, Sr.

[57] ABSTRACT

A programmable electronic thermostat is provided for controlling operation of a multistage heating apparatus comprising a heat pump and auxiliary heat. A salient feature is a program which provides for economical recovery from a setback temperature. The program includes logic which determines, at the beginning of the recovery time, whether any or all of the auxiliary stages will be temporarily locked out and thus prevented from being energized. This determination is based on a characteristic which is dependent upon the heating demand that is presently being placed on the heating apparatus. The program also includes logic which determines, near the end of the recovery time, whether any or all of the locked stages are to be unlocked. This determination is based on the magnitude of the difference between the temperature existing at the time of determination and the temperature desired at the end of the recovery time.

7 Claims, 5 Drawing Sheets

PROGRAMMABLE ELECTRONIC THERMOSTAT WITH MEANS FOR ENABLING ECONOMICAL RECOVERY

BACKGROUND OF THE INVENTION

This invention relates to programmable electronic thermostats, and particularly to such thermostats which control operation of multistage heating apparatus.

A typical multistage heating apparatus comprises a heat pump which provides a first stage of heating, and electrical resistance heaters, sometimes referred to as auxiliary heaters, which provide additional stages of heating. Operation of the auxiliary heaters is less energy efficient than operation of the heat pump so that, for economy, it is desirable that use of the auxiliary heaters be minimized. For example, when the thermostat provides a temperature setback function, it is desirable, for economy, that use of the auxiliary heaters be minimized during the time, sometimes referred to as recovery time, that the heating apparatus is attempting to return the temperature of the controlled space from a setback temperature to a normal comfort temperature.

SUMMARY OF THE INVENTION

An object of this invention is to provide a generally new and improved programmable electronic thermostat for controlling operation of multistage heating appartaus, which thermostat includes program means for providing for economical recovery from a setback temperature.

In accordance with the present invention, there is provided a programmable electronic thermostat with program means therein, which program means determines the time at which recovery from a setback temperature is initiated; which program means determines, at the time at which recovery is initiated and based on a demand indicator, whether any stages beyond stage one in a multistage heating system shall be locked out and thus prevented from being energized; and which program means determines, near the end of the recovery period, whether any locked out stages shall be unlocked.

The above-mentioned and other objects and features of the present invention will become apparent from the following description when read in conjunction with the accompanying drawings.

DESCRIPTION OF THE PREFERRED EMBODIMENT

Figure 1:
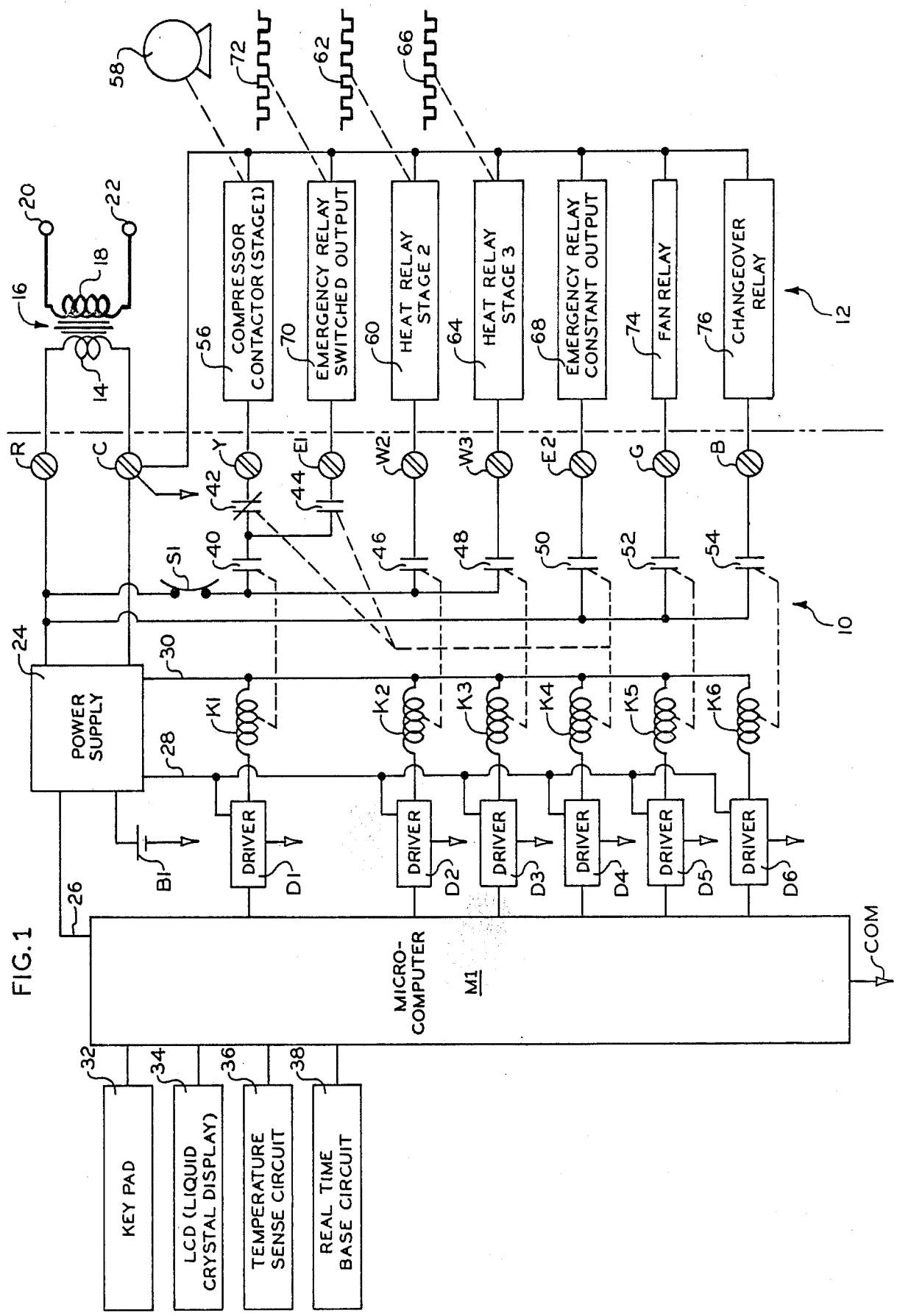
FIG. 1 is a schematic illustration, largely in block form, of a thermostat incorporating the present invention and shown connected to multistage heating and cooling apparatus.

Referring to FIG. 1, shown generally at 10 is a programmable electronic thermostat for controlling operation of a multistage heating and cooling apparatus shown generally at 12.

Thermostat 10 is provided with terminal screws R and C which are connected to opposite ends of the low voltage secondary winding 14 of a voltage step-down transformer 16. The primary winding 18 of transformer 16 is connected across terminals 20 and 22 of a conventional 120 volt alternating current power source. Thermostat 10 also includes a power supply 24 connected across terminal screws R and C and adapted to provide output voltages on leads 26, 28, and 30. A battery B1 provides a back-up power source for thermostat 10.

Thermostat 10 includes a programmable microcomputer M1. In the preferred embodiment, microcomputer M1 is an NEC $\mu$PD7503, which is a CMOS 4-bit single chip device and which includes an ALU (arithmetic logic unit), an accumulator, a 4096×8-bit ROM (read only memory), a 224×4-bit RAM (random access read/write memory), an 8-bit timer/event counter, a display controller/driver, and 23 I/O input/output) lines. Connected to microcomputer M1 are a keypad 32, an LCD (liquid crystal display) 34, a temperature sense circuit 36, and a real time base circuit 38.

Keypad 32 comprises a matrix switch having individual keys which enable the user to program microcomputer M1 so as to provide a desired time-temperature schedule of operation of thermostat 10.

LCD 34 provides a plurality of display elements for designating time and temperature.

Temperature sense circuit 36 includes a thermistor (not shown) in circuit with an oscillator, the output frequency of which is a function of the ambient temperature sensed by the thermistor. This frequency is measured by microcomputer M1 and converted to a measurement of degrees of temperature, for example, to degrees Fahrenheit with 1/16° F. resolution.

Real time base circuit 38 includes a crystal oscillator and provides an accurate time base for all real time functions.

Also connected to microcomputer M1 are a plurality of drivers D1 through D6 which are connected to a plurality of relay coils K1 through K6, respectively, and to power supply 24. Relay coils K1 through K6 operate a plurality of relay contacts 40, 42, 44, 46, 48, 50, 52, and 54 which, in turn, control energizing of heating and cooling apparatus 12.

More specifically, a compressor contactor 56 is connected at one end to terminal screw Y of thermostat 10, and at its other end to terminal screw C. Terminal screw Y is connected to terminal screw R through relay contacts 40 and 42 and a normally-closed high-temperature limit switch S1. When switch S1 and relay contacts 40 and 42 are closed, compressor contactor 56 is energized by the lowvoltage appearing across terminal screws R and C. With compressor contactor 56 energized, the main stage (stage 1) of the multistage apparatus 12 is energized. In the preferred embodiment, stage 1 is the compressor 58 of a heat pump.

A relay 60 is connected between terminal screws R and C through terminal screw W2, relay contacts 46, and switch S1. When switch S1 and relay contacts 46 are closed, relay 60 is energized, causing stage 2 of the heating equipment in apparatus 12 to be energized. As shown, stage 2 can comprise an electrical resistance heater 62.

Similarly, a relay 64 is connected between terminal screws R and C through a terminal screw W3, relay contacts 48, and switch S1. When switch S1 and relay contacts 48 are closed, relay 64 is energized, causing stage 3 of the heating equipment in apparatus 12 to be energized. As shown, stage 3 can comprise an electrical resistance heater 66.

A relay 68 is connected between terminal screws R and C through terminal screw E2 and relay contacts 50. Another relay 70 is connected between terminal screws R and C through terminal screw E1, relay contacts 44 and 40, and switch S1. When relay coil K4 is energized, it effects closing of relay contacts 44 and 50 and opening of relay contacts 42. Relay 70, in turn, controls an electrical resistance heater 72. Relays 68 and 70 are intended to be energized only during an emergency mode of operation.

A fan relay 74 is connected between terminal screws R and C through terminal screw G and relay contacts 52. Fan relay 74 controls the fan or blower (not shown) which circulates conditioned air throughout the dwelling.

A changeover relay 76 is connected between terminal screws R and C through terminal screw B and relay contacts 54. When relay contacts 54 are open, changeover relay 76 is de-energized so that the heat pump is in a cooling mode; when relay contacts 54 are closed, changeover relay 76 is energized, placed the heat pump in a heating mode.

Thermostat 10 is programmable by the homeowner to provide timetemperature schedules for both heating and cooling. Since this invention relates to a feature pertinent only to control of the heating apparatus, the following description omits discussion of functions relating to cooling.

In heating, thermostat 10 is programmable by the homeowner to provide for different set point temperatures during different time periods in a repetitive 24hour time span, the particular set point temperature and time periods being determined by the homeowner's particular desires. For example, the homeowner may program thermostat 10 to provide a set point temperature of 70° F. beginning at 6:00 a.m., when arising; a set point temperature of 62° F. beginning at 9:00 a.m., when leaving the dwelling; a set point temperature of 70° F. beginning at 4:00 p.m., when returning to the dwelling; and a set point temperature of 62° F. beginning at 11:00 p.m., when retiring.

For reasons of comfort, it is desirable that, at 6:00 a.m. and at 4:00 p.m. in this example, the dwelling be at or very near the set point temperature of 70° F.; for reasons of economy, it is necessary that thermostat 10 control operation of the heating apparatus in such a manner that the savings due to the lower set point temperature of 62° F. are not negated by the manner in which recovery of the dwelling from the lower set point temperature of 62° F. is accomplished.

Figure 3:
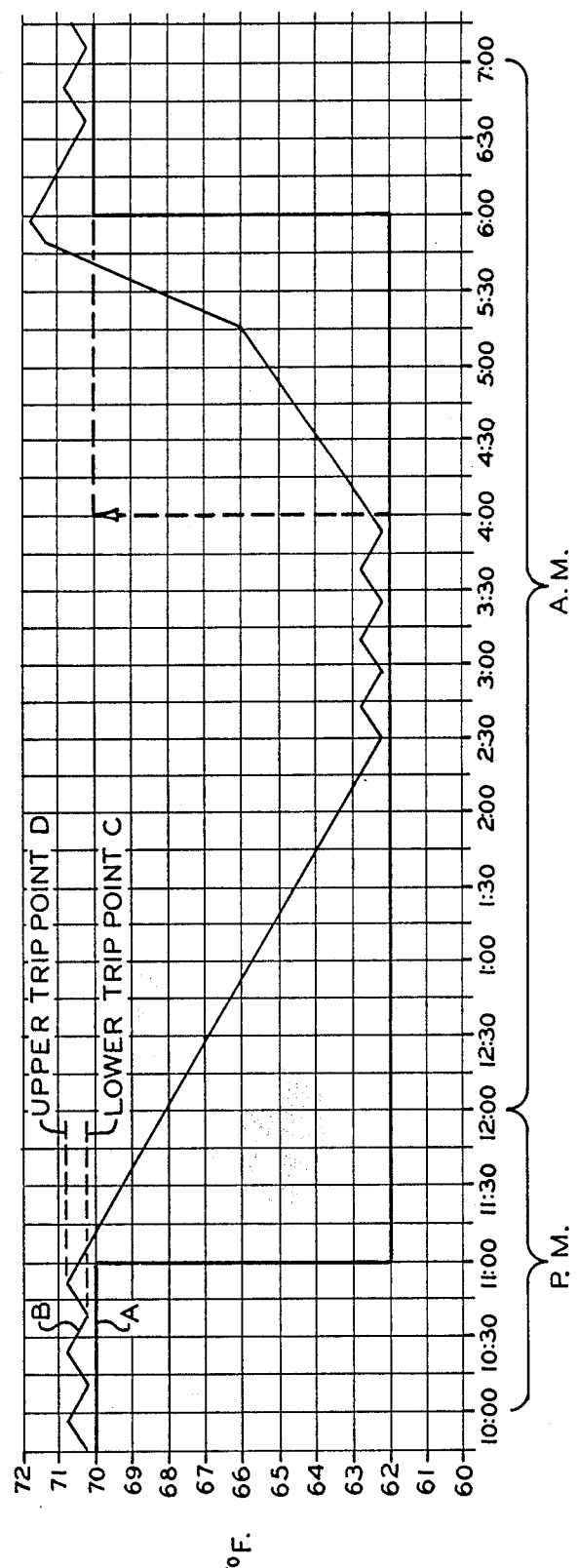
FIGS. 3 and 4 are time-temperature charts depicting the cycling characteristics during recovery of the thermostat of FIG. 1 during mild weather and cold weather, respectively.

Referring to FIG. 3, shown therein is a portion of the above-exemplified time-temperature schedule. It is to be noted that the concepts herein described in recovering to 70° F. at 6:00 a.m. also apply in recovering to 70° F. at 4:00 p.m.

In FIG. 3, programmed set point temperature is indicated at A and a buffered temperature is indicated at B. Programmed set point temperature A is shown as changing from 70° F. to 62° F. at 11:00 p.m., and from 62° F. back to 70° F. at 6:00 a.m. Buffered temperature B is a composite temperature value including an ambient temperature component provided by temperature sense circuit 36 and a demand indicator component.

The demand indicator component can be any measureable characteristic related to demand for operation of the heating apparatus. For example, the demand indicator component could be related to outside temperature or to the duty cycle of thermostat 10. In the preferred embodiment, the demand indicator component is a count value in an anticipation counter in RAM, each count representing 1/16° F. The count value is added to the ambient temperature component when thermostat 10 is in the heating mode of operation. Basically, the counter is incremented when the heating apparatus is energized and decremented when the heating apparatus is deenergized. The incrementing and decrementing occur at predetermined time intervals. If the demand for operation of the heating apparatus is high, that is to say, if the heating apparatus is being energized for a considerably greater portion of time than it is de-energized, then the count value is high because the count is incremented for a considerably longer period of time than it is decremented. Conversely, if the demand for operation of the heating apparatus is low, that is to say, if the heating apparatus is being energized for a lesser or only slightly greater portion of time than it is de-energized, then the count value is low. Thus, the value of the count is an indication of the degree of demand for operation of the heating apparatus.

Associated with the set point temperature A is a lower trip point C which is 3/16° F. above the set point temperature A, and an upper trip point D which is 12/16° F. above the set point temperature A. Basically, when the buffered temperature B drops below the lower trip point C, one or more stages of heat are energized, and when the buffered temperature B rises above the upper trip point D, the stages of heat are de-energized.

Figure 2A:
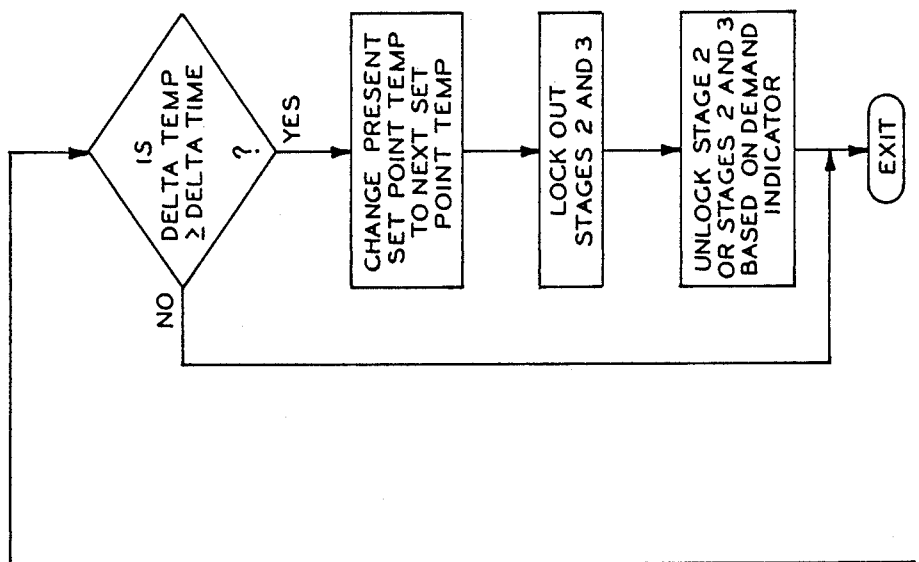
FIGS. 2A and 2B, when combined, is a flow chart depicting recovery logic programmed into and executed by the thermostat of FIG. 1.
Figure 2A:
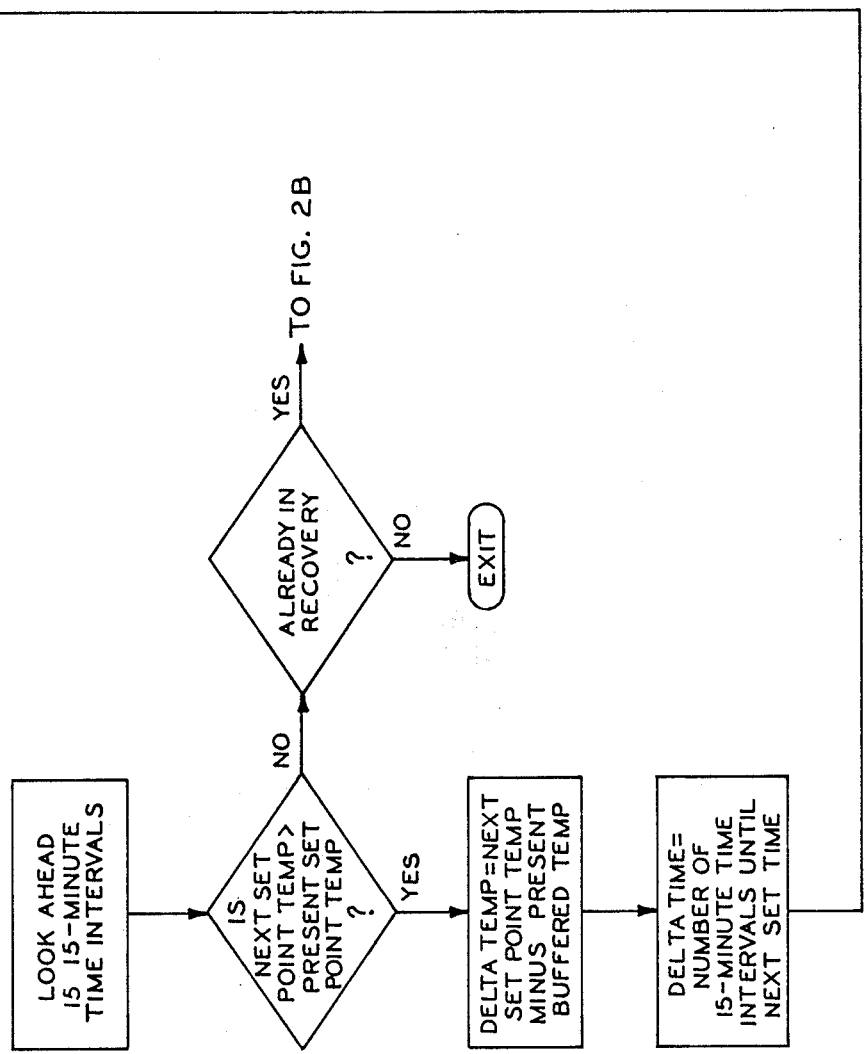
Figure 2B:
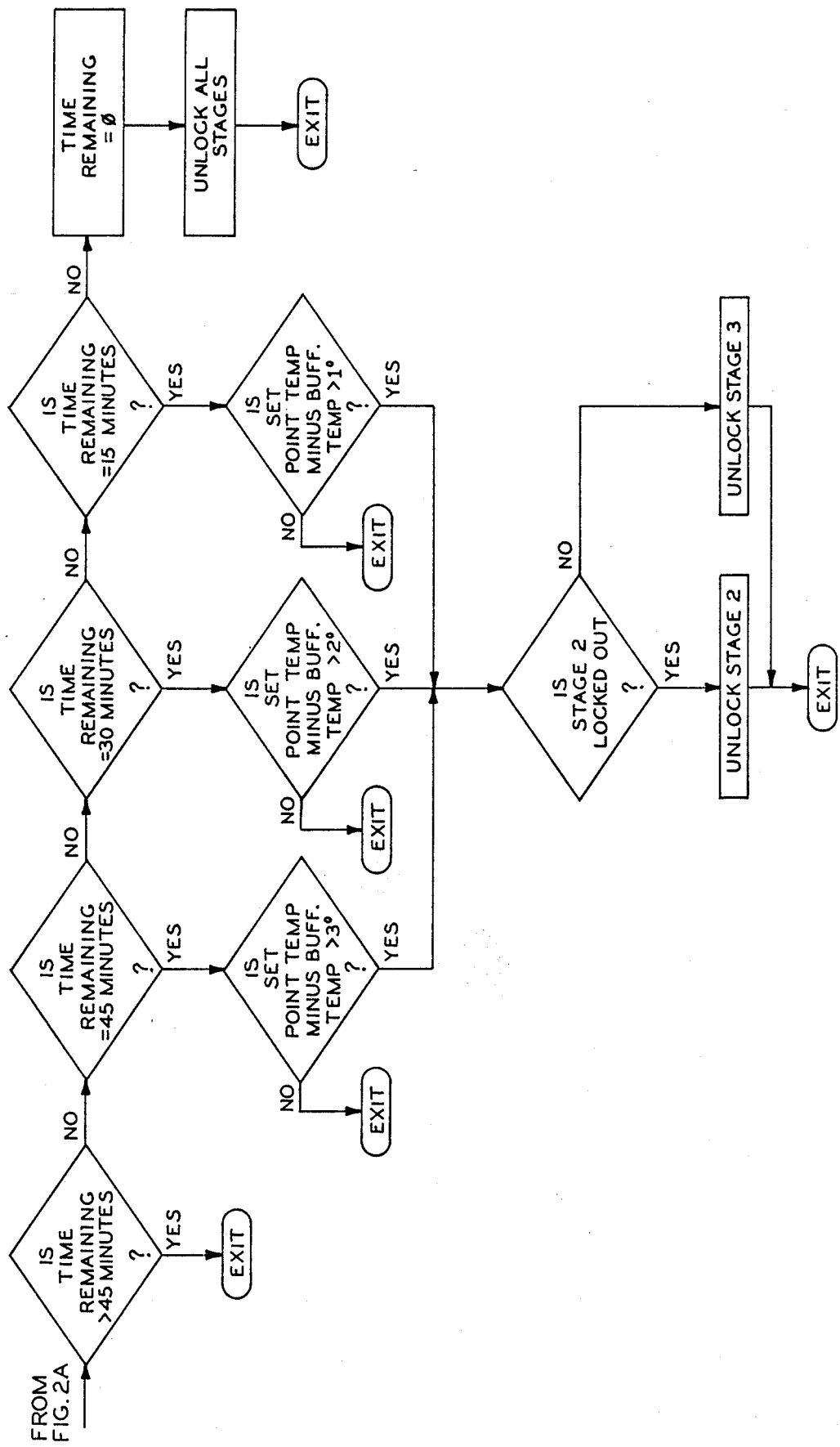

Referring to FIGS. 2A, 2B, and 3, thermostat 10, every fifteen minutes, looks ahead fifteen 15-minute time intervals for the next program set time. If the next program set time occurs within the next fifteen 15-minute time intervals, the logic inquiry is whether the set point temperature associated with the next program set time is greater than the present set point temperature. If yes, a delta temperature and a delta time are calculated; if no, the inquiry is whether the thermostat 10 is already in recovery. If thermostate 10 is not already in recovery, the program exits until the next 15-minute interrupt. If thermostat 10 is already in recovery, the program logic proceeds in a manner to be hereinafter described.

For example, as illustrated in FIG. 3, prior to 11:00 p.m., buffered temperature B varies between the lower trip point C and the upper trip point D in accordance with a temperature algorithm in the program of thermostat 10. Prior to 11:00 p.m., the next program set time of 11:00 p.m. is detected. Since the next set point temperature A of 62° F. is less than the present set point temperature A of 70° F., the temperature algorithm to maintain 70° F. remains in effect.

At 11:00 p.m., the set point temperature A of 70° F. changes to 62° F. The lower trip point C and upper trip point D change along with the change in set point temperature A so that the lower trip point becomes 62 3/16° F. and the upper trip point becomes 62 12/16° F. Because buffered temperature B is greater than the new upper trip point of 62 12/16° F., the heating apparatus, if not already deenergized, is de-energized and the buffered temperature B decreases.

Assuming the existence of a relatively mild outside temperature, buffered temperature B decreases gradually. For example, it is illustrated in FIG. 3 as dropping below 62 3/16° F. at approximately 2:30 a.m. Since 62

3/16° F. is the lower trip point C, the heating apparatus is again energized at that time.

It is noted that, at 2:15 a.m., the program set time that is scheduled to occur at 6:00 a.m. is within fifteen 15-minute time intervals. Therefore, at 2:15 a.m., the logic of FIG. 2A states that a delta temperature and a delta time are to be calculated. As shown in FIG. 2A, delta temperature is equal to the next set point temperature minus the present buffered temperature, and delta time is equal to the number of 15-minute time intervals until the next set time. In the example of FIG. 3, at 2:15 a.m., delta temperature 32 70° F.−62° F.=8° F.; delta time=15. It is noted that the buffered temperature B is stripped of its fractional value when calculating delta temperature.

The logic of FIG. 2A proceeds to an inquiry of whether delta temperature is greater than or equal to delta time. when the answer is no, as is the case at 2:15 a.m. in the example of FIG. 3, the program exits. Therefore, so long as the answer is no, thermostat 10 executes its temperature algorithm so as to maintain 62° F.

At 4:00 a.m., delta temepature is 8° F. and delta time is 8. Therefore, in accordance with the logic of FIG. 2A, the present set point temperature A of 62° F. is changed to the next set point temperature A of 70° F.

Stages 2 and 3 are then locked out. However they can be immediately unlocked, based on a demand indicator. In FIG. 3, the demand indicator, which is preferably a count value in an anticipation counter as previously descirbed, is relatively low. That is to say, with the assumed relatively mild outside temperature, the 62° F. set point temperature was maintained by stage 1 alone, and the on time of stage 1 was slightly less than its off time so that the anticipator count is relatively low. With a low anticipator count (demand indicator), stages 2 and 3 remain locked out.

Therefore, beginning at 4:00 a.m., thermostat 10 energizes the heat pump continuously and prevents energizing of stages 2 and 3. In accordance with the logic of FIGS. 2A and 2B, this condition continues until 45 minutes before 6:00 a.m.

It is to be noted that the initiation of recovery when delta temperature is equal to delta time presumes that, normally, recovery can be accomplished by the heat pump alone at a rate of 4° F. per hour.

At 5:15 a.m., the determination is made as to whether the set point temperature A minus the buffered temperature B is greater than 3° F. Buffered temperature B is stripped of its fractional value for this calculation. If no, the program exits; if yes, an inquiry is made as to whether stage 2 is locked out. If yes, stage 2 is unlocked; if no, stage 3 is unlocked. In the example of FIG. 3, the set point temperature A minus the buffered temperature B, at 5:15 a.m., is greater than 3° F. Also, both stage 2 and 3 are locked out. Therefore, at 5:15 a.m. stage 2 is unlocked, is energized, and the buffered temperature B rises at a steeper rate.

At 5:30 a.m., the determination is made as to whether the set point temperature A minus the buffered temperature B is greater than 2° F. If no, the program exits; if yes, the inquiry is made as to whether stage 2 is locked out. If yes, stage 2 is unlocked; if no, stage 3 is unlocked. In the example of FIG. 3, the set point temperature A minus the buffered temperature B, at 5:30 a.m., is less than 2° F. Therefore, the program exits with no change to the stages. That is to say, stages 1 and 2 remain on and stage 3 remains locked out.

At 5:45 a.m., the determination is made as to whether the set point temperature A minus the buffered temperature B is greater than 1° F. If no, the program exits; if yes, the inquiry is made as to whether stage 2 is locked out. If yes, stage 2 is unlocked; if no, stage 3 is unlocked. In the example of FIG. 3, the buffered temperature B is slightly above the set point temperature A at 5:45 a.m. Therefore, the program exits with no change to the stages. It is noted that since buffered temperature B is at the upper trip point D at 5:45 a.m., stage 2, and subsequently stage 1, are de-energized shortly thereafter. At 6:00 a.m., stage 3, the remaining locked out stage, is unlocked.

Figure 4:
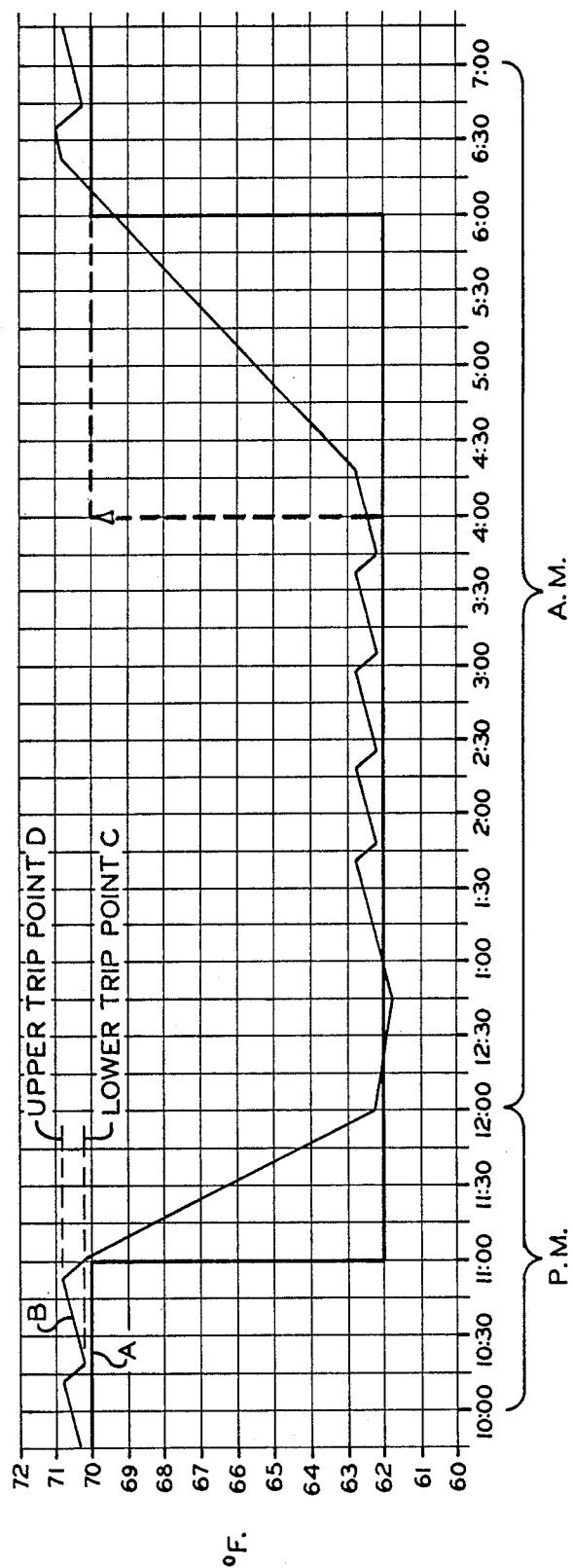

Operation of thermostate 10 during extremely cold outside temperature is illustrated in FIG. 4. It is noted that, prior to 11:00 p.m., stage 1 is continuously energized and stage 2 is cycled on and off. At 11:00 p.m., stage 1 is de-energized and the buffered temperature B decreases rapidly. Stage 1 is again energized when buffered temperature B drops below the lower trip point C value of 62 3/16° F., which occurs at approximately 12:00 midnight. Even with stage 1 energized, buffered temperature B continues to drop, but at a lesser rate. With stage 1 on, the anticipator count increments. The temperature algorithm provides for energizing stage 2 when the anticipator count reaches a predetermined value and buffered temperature B is below lower trip point C. This combined condition is illustrated in FIG. 4 as occurring at approximately 12:45 a.m. Thus, at 12:45 a.m., stage 2 is energized. Therefore, beginning at 12:45 a.m. stage 1 remains on continuously and stage 2 is cycled on and off.

At 4:00 a.m., delta temperature is equal to delta time. Accordingly, the set point temperature A is changed from 62° F. to 70° F. and stages 2 and 3 are locked out. However, based on the demand indicator, stages 2 and 3 are immediately unlocked.

Specifically, in FIG. 4, because stage 1 has been continuously energized for several hours before 4:00 a.m., and stage 2 is being cycled on and off, the anticipator count at 4:00 a.m. is relatively high. With a relatively high anticipator count (demand indicator), both stages 2 and 3 are unlocked. While stage 3 is unlocked at 4:00 a.m., it is not energized until a later time, such as approximately 4:20 a.m. This delay is due to the temperature algorithm which provides for energizing stage 3 at the occurrence of the combined condition of the anticipator count reaching a predetermined value and buffered temperature B being below lower trip point C.

At 5:15 a.m., the set point temperature A minus the buffered temperature B is greater than 3° F. Since both stages 2 and 3 are already on, they simply remain on. At 5:30 a.m., the set point temperature A minus the buffered temperature B is greater than 2° F. Again, since both stages 2 and 3 are already on, they simply remain on. At 5:45 a.m. the set point temperature A minus the buffered temperature B is greater than 1° F. so that, again, stages 2 and 3 simply remain on.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:

1. In a programmable elctronic thermostat for controlling operation of multistage heating apparatus, the thermostat including a microcomputer which provides means for storing a time-temperature program comprising a plurality of chronologically arranged set times and associated set point temperatures;

means for looking ahead a predetermined number of time intervals in said time-temperature program for a next one of said set times;

means, effective when said means for looking ahead determines that said next one of said set times is programmed to occur within said predetermined number of time intervals, for comparing a next one of said set point temperatures with a present one of said set point temperatures;

means, responsive to said comparison indicating that said next one of said set point temperatures is greater than said present one of said set point temperatures, for calculating the value of temperature difference between said next one of said set point temperatures and a buffered temperature, said buffered temperature being a composite temperature value including a component based on sensed temperature and a component based on a characteristic related to demand for operation of the multistage heating apparatus;

means for comparing said calculated value of temperature difference and the number of time intervals, of said predetermined number of time intervals, remaining until said occurrence of said next one of said set times;

means for initiating recovery to said next one of said set point temperatures at a time when said calculated value of temperature difference is greater than or equal to said remaining number of time intervals, said means for initiating recovery including means for changing the set point temperature from said present one of said set point temperatures to said next one of said set point temperatures, locking out all stages except a first stage of said multistage heating apparatus, and immediately unlocking one or more of said locked stages as determined by said characteristic related to demand;

means for maintaining recovery with said first stage and only the stage or stages of said one or more of said locked stages which are unlocked at said time when recovery is initiated; and means for calculating the value of temperature difference between said next one of said set point temperatures and said buffered temperature at predetermined times prior to said occurrence of said next one of said set times and for selectively unlocking said locked stages at said predetermined times if said calculated temperature difference at said predetermined times is sufficiently great.

2. The thermostat claimed in claim 1 further including means for unlocking all of said locked stages at said occurrence of said next one of said set times.

3. The thermostat claimed in claim 1 wherein said time at which said recovery is initiated is based on an approximately four degrees Fahrenheit per hour recovery rate.

4. The thermostat claimed in claim 1 wherein said predetermined number of time intervals embodied in said means for looking ahead is approximately fifteen, and wherein the value of each of said time intervals is approximately fifteen minutes.

5. The thermostat claimed in claim 1 wherein said selective unlocking comprises unlocking only the locked stage nearest said first stage.

6. The thermostat claimed in claim 1 wherein said predetermined times prior to said occurrence of said next one of said set times comprises approximately forth-five minutes, thirty minutes, and fifteen minutes.

7. The thermostat claimed in claim 6 wherein said selective unlocking occurs at said forty-five minutes if said calculated temperature difference at said forty-five minutes is greater than approximately three degrees Fahrenheit, at said thirty minutes if said calculated temperature difference at said thirty minutes is greater than approximately two degrees Fahrenheit, and at said fifteen minutes if said calculated temperature difference at said fifteen minutes is greater than approximately one degree Fahrenheit

* * * * *